United States Patent [19]

Makino

[11] Patent Number: 5,640,003

[45] Date of Patent: Jun. 17, 1997

[54] IC CARD DEVICE FOR MANAGING SYSTEM

[75] Inventor: Tadayori Makino, Tokyo, Japan

[73] Assignee: Matsushita Electric Industrial Co., Ltd., Osaka, Japan

[21] Appl. No.: 492,800

[22] Filed: Jun. 20, 1995

[30] Foreign Application Priority Data

Jul. 26, 1994 [JP] Japan .................. 6-173994

[51] Int. Cl.$^6$ .................................................. E06K 19/06
[52] U.S. Cl. ............................................ 235/491; 235/492
[58] Field of Search .................................. 235/380, 384, 235/375, 491, 492; 455/51.4, 88, 38.1; 342/44, 42, 51; 340/825.34

[56] References Cited

U.S. PATENT DOCUMENTS

| | | | |
|---|---|---|---|
| 4,375,032 | 2/1983 | Uchida | 235/380 |
| 4,546,241 | 10/1985 | Walton | 235/380 |
| 4,580,041 | 4/1986 | Walton | 235/380 |
| 4,656,472 | 4/1987 | Walton | 340/825.34 |
| 5,124,699 | 6/1992 | Tervoert et al. | 340/825.54 |
| 5,241,160 | 8/1993 | Bashan et al. | 235/380 |
| 5,311,186 | 5/1994 | Utsu et al. | 342/51 |
| 5,351,052 | 9/1994 | D'Hont et al. | 342/42 |
| 5,444,448 | 8/1995 | Schuermann et al. | 342/42 |
| 5,448,242 | 9/1995 | Sharpe et al. | 342/42 |
| 5,489,908 | 2/1996 | Orthmann et al. | 342/42 |

FOREIGN PATENT DOCUMENTS

| | | | |
|---|---|---|---|
| 0405695 | 1/1991 | European Pat. Off. | G06K 7/00 |
| 0203289 | 7/1987 | Japan | G06K 17/00 |
| 1201793A | 8/1989 | Japan . | |
| 2226392A | 9/1990 | Japan . | |
| 6036089 | 10/1994 | Japan | G06K 19/073 |
| 2116808 | 9/1983 | United Kingdom . | |
| 9427253 | 10/1994 | WIPO | G06K 17/00 |

Primary Examiner—Donald T. Hajec
Assistant Examiner—Thien Minh Le
Attorney, Agent, or Firm—Watson Cole Stevens Davis P.L.L.C.

[57] ABSTRACT

An IC card device capable of transmitting identification data to an inquiring unit without involving interference even when a plurality of IC card devices stay in the vicinity of the inquiring unit over a certain time. As the IC card device approaches the inquiring unit, the field intensity of a signal received by a receiver circuit incorporated in the IC card device increases. When it is determined that the field intensity exceeds a preset threshold level, a reception level determination circuit reads out identification data from a memory. A transmitter circuit transmits repeatedly the identification data signal to the inquiring unit. When the number of times the identification data is transmitted reaches a preset number, a counter stops the transmitting operation of the transmitter circuit. When it is determined by a reception level determination circuit that the field intensity exceeds the preset threshold value, a timer causes the receiver circuit to stop reception of the signal transmitted from the inquiring unit for a predetermined period.

3 Claims, 3 Drawing Sheets

IC CARD DEVICE FOR MANAGING SYSTEM

BACKGROUND OF THE INVENTION

1. Field of the Invention

The present invention relates generally to a system for managing entrance/exit of people, customers in shops, cars or automobiles in a parking area or the like. More particularly, the invention is concerned with an IC card device used in the system such as mentioned above which device is carried by a person or installed in a car for transmitting data previously registered therein in response to reception of an inquiry radio signal issued by an inquiring unit installed at an entrance/exit port or like place.

2. Description of Related Art

Heretofore, the above-mentioned type IC card device carried by people, installed in cars or other mobile objects is so designed as to send back the data registered previously (e.g. identification data) in response to reception of an a radio wave inquiry signal transmitted from an inquiring unit disposed in the vicinity of an entrance/exit port or gate. On the other hand, the data received by the inquiring unit is processed for thereby permitting or inhibiting passage of the person, car or other mobile object through the gate. With this system, management of the people or cars passing through the gate can be performed very easily and conveniently.

However, the IC card device known heretofore suffers from a problem that when there exist a plurality of IC card devices making access to a single inquiring unit, there takes place interference among the identification data signals transmitted from the IC card devices, which makes it impossible for the inquiring unit to recognize discriminatively the individual identification data from one another.

As one of the measures to cope with the problem mentioned above, it is described in JP-A-2-226392 to control the field intensity of the inquiry radio signal when the presence of plural IC card devices is detected. However, this proposal is not effective to suppress the interference when a plurality of IC card devices continue to stay for a given time at one place, for example, in front of a gate obstructing passage of people or cars. Further, there is disclosed in JP-A-1-201793 a method according to which the inquiring unit commands the IC card device to stop transmitting the identification data when the inquiring unit recognizes the identification data. Although this system is effective for coping with the aforementioned problem, difficulty is yet seen in that the internal structure of the IC card device becomes very complicated.

SUMMARY OF THE INVENTION

In the light of the state of the art described above, it is an object of the present invention to provide an improved IC card device which is capable of transmitting the identification data to the inquiring unit without involving interference even when a plurality of IC card devices stay in the vicinity of the inquiring unit over a certain period.

In view of the above and other objects which will become apparent as the description proceeds, there is provided according to an aspect of the present invention an IC card device which includes a receiver means for receiving a radio signal transmitted to the IC card device to thereby output a reception signal, a memory in which data is previously stored, reception level determination means for reading out the data stored in the memory to output the data when determining that a level of the reception signal output from the receiver means exceeds a predetermined threshold level, event counter means for counting a number of times the data is transmitted from the transmitter means to thereby stop transmitting operation of the transmitter means when the aforementioned number of times reaches a preset number, and timer means for stopping receiving operation of the receiver means for a predetermined time period when the reception level determination means determines that a level of the reception signal output from the receiver means exceeds a predetermined threshold level.

With the arrangement of the IC card device described above, the IC card device approaching the inquiring unit repeatedly transmits the data stored in the memory incorporated in the IC card device for a predetermined number of times determined by the event counter means, whereupon the transmitter means incorporated in the IC card device stops the data transmission for a predetermined time. By virtue of this arrangement, discrimination of the IC card device from other IC card device(s) can be much facilitated.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings.

Embodiment 1

Figure 1:
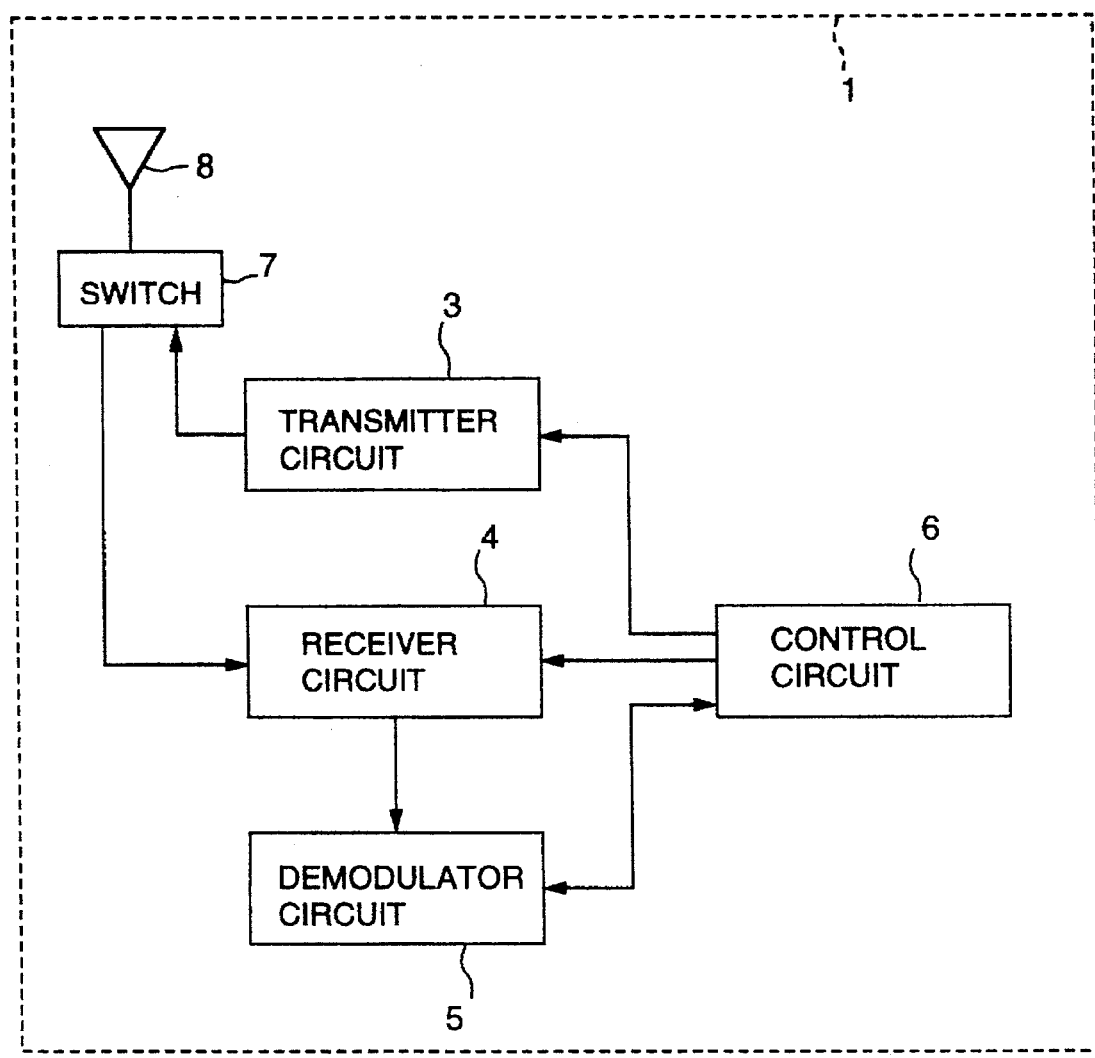
FIG. 1 is a block diagram showing a structure of an inquiring circuit which may be used in combination with an IC card device according to the present invention.

A first embodiment of the invention will be described. FIG. 1 is a block diagram showing an inquiring unit which can be used together with an IC card device according to the present embodiment. Referring to the figure, the inquiring unit 1 is installed at an entrance/exit port for people, cars or the like and adapted to transfer (i.e., transmit and receive) information with an IC card device 2 shown in FIG. 2 by using radio waves. In the inquiring unit 1, a transmitter circuit 3 is designed to transmit by way of a switch 7 and an antenna 8 a radio signal of a frequency f1 for starting operation of the IC card device 2. On the other hand, a receiver circuit 4 is designed to receive by way of the antenna 8 and the switch 7 a signal of a frequency f2 transmitted from the IC card device 2. A demodulator circuit 5 demodulates the signal received by the receiver circuit 4 for allowing identification data of the IC card device to be derived from the demodulated output. The output of the demodulator circuit 5 is connected to a control circuit 6 which is in charge of controlling operations of the transmitter circuit 3, the receiver circuit 4 and the demodulator circuit 5.

Figure 2:
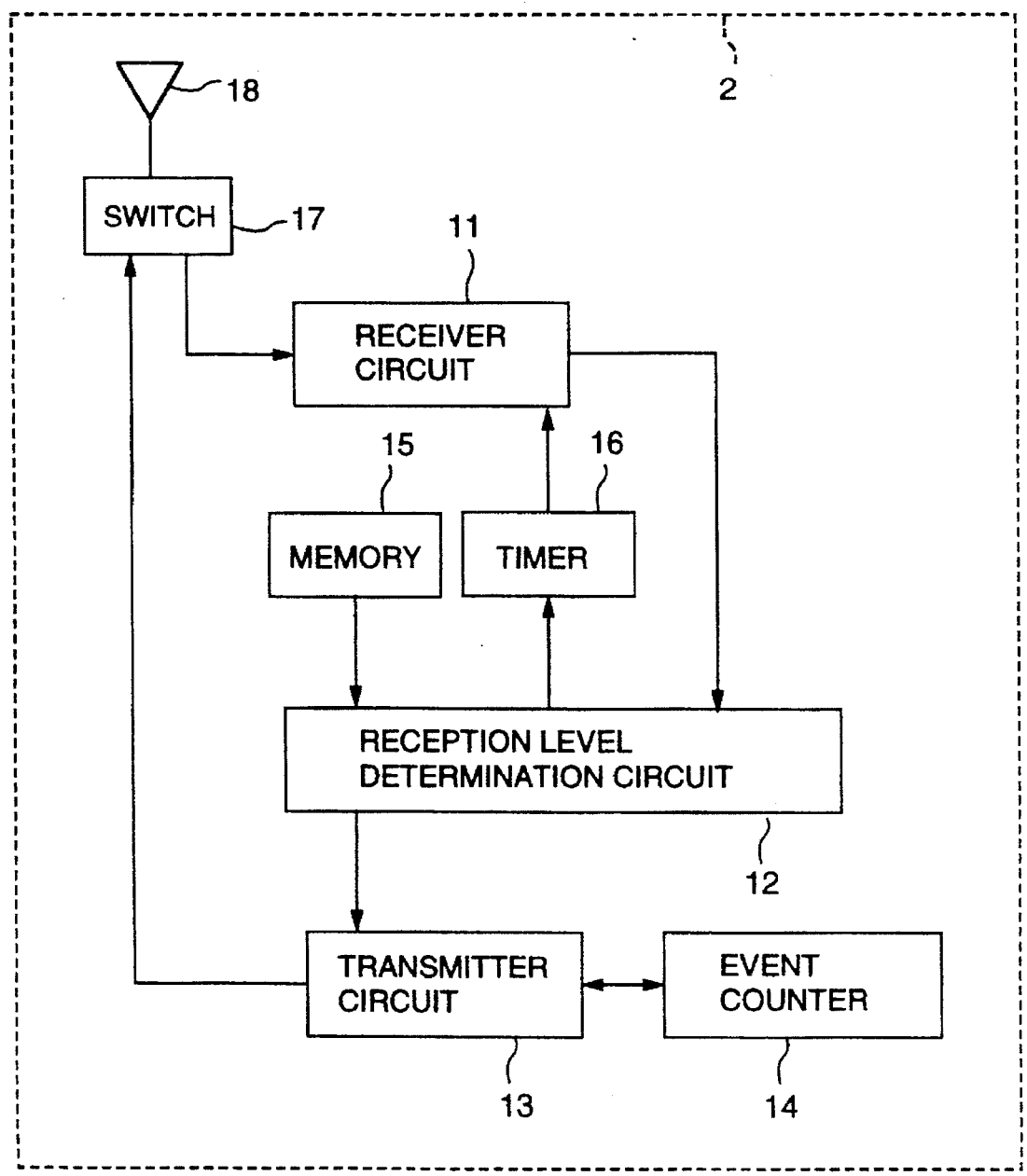
FIG. 2 is a block diagram showing a circuit configuration of an IC card device according to a first embodiment of the invention.

FIG. 2 is a block diagram showing a circuit configuration of the IC card device according to the first embodiment of the present invention. Referring to FIG. 2, the IC card device 2 is implemented as a contactless IC card for transferring data with the inquiring unit 1 shown in FIG. 1 by using radio waves. The internal structure of the IC card device 2 is as follows. A reference numeral 11 denotes a receiver circuit for receiving the signal of frequency f1 transmitted from the inquiring unit 1 via an antenna 18 and a switch 17. A reference numeral 12 denotes a reception level determining circuit for determining discriminatively the field intensity of the radio signal of frequency f1 by checking whether the signal of the frequency f1 exceeds a preset threshold level. A reference numeral 13 denotes a transmitter circuit for transmitting repeatedly a modulated signal of the frequency f2 to the inquiring unit 1 via the switch 17 and the antenna 18. The transmitter circuit 13 starts transmitting the signal of frequency f2 when it is determined by the reception level determination circuit 12 that a level of the signal of frequency f1 exceeds the preset threshold level. A reference numeral 14 denotes an event counter for counting the transmitting events of the transmitter circuit 13 (i.e., the number of times the signal of frequency f2 is transmitted by the transmitter circuit 13) up to a preset number. A memory 15 stores therein identification data inherent to the IC card device 2. A timer 16 measures time at least for a preset time period.

Next, description will be directed to operation of the IC card device according to the present embodiment. The receiver circuit 11 incorporated in the IC card device 2 receives the signal of frequency f1 transmitted from the transmitter circuit 3 of the inquiring unit 1. As the IC card device 2 moves toward the inquiring unit 1, the field intensity of the radio signal of frequency f1 received by the receiver circuit 11 of the IC card device 2 increases. When it is determined by the reception level determination circuit 12 that the field intensity of the radio signal of frequency f1 exceeds the preset threshold level, the identification data is read out from the memory 15. The transmitter circuit 13 modulates the signal of frequency f2 with the identification data read out from the memory 15 and transmits repeatedly the modulated signal to the inquiring unit. When the number of times the identification data is transmitted from the transmitter circuit 13 (i.e., the number of transmitting events) reaches a preset number, the event counter 14 stops the identification data transmitting operation of the transmitter circuit 13. On the other hand, when it is determined by the reception level determination circuit 12 that the field intensity of the radio signal of frequency f1 transmitted from the inquiring unit exceeds the preset threshold level, the timer 16 causes the receiver circuit 11 to stop reception of the signal of frequency f1 transmitted from the inquiring unit for a predetermined period.

At this juncture, it should be mentioned that in the case of the present embodiment, it is presumed that during a short time span between a time point at which the identification data signal arrives at first at the inquiring unit 1 and a time point at which the identification data signal arrives secondly at the inquiring unit 1, transmission of the identification data of the IC card device 2 arrived at first at the inquiring unit can be completed. In this conjunction, assuming that the rate of data transmission between the IC card device 2 and the inquiring unit 1 is about several 10 kbps and that total bits of the identification data to be transmitted for a preset number of times are several ten bits, it is then required that the aforementioned time span is to be greater than about 1/10000 second. The time span on the order of 1/10000 second equivalently corresponds to a distance of about 1 cm between adjacent two IC card devices 2 when they are carried by walking persons. On the other hand, in the case where the IC card devices are installed on a plurality of cars, respectively, and where gates are opened and closed at an entrance/exit port of a parking area, the distance between the adjacent two IC card devices 2 covers at least the length of the car.

In this manner, according to the invention incarnated in the first embodiment, there can be obtained an advantage that the IC card device 2, which has once transmitted the allocated identification data, is prohibited from transmitting again the identification data even when the IC card device 2 stays for a predetermined time in an area having the same field intensity because the IC card device 2 stops the reception of the signal of frequency f1 from the inquiring unit 1 after the IC card device 2 has transmitted the identification data a predetermined number of times.

Embodiment 2

Next, a second embodiment of the invention will be described on the assumption that the inquiring unit 1 shown in FIG. 1 is employed in combination with the IC card device according to the present embodiment. The inquiring unit 1 is installed at an entrance/exit port for people, cars or the like and adapted to transfer information with an IC card device 22 shown in FIG. 3 by using a radio wave. In the inquiring unit 1, a transmitter circuit 3 transmits by way of a switch 7 and an antenna 8 a radio signal of a frequency f1 for starting operation of the IC card device 22. On the other hand, a receiver circuit 4 receives by way of the antenna 8 and the switch 7 a signal of a frequency f2 transmitted from the IC card device 22. A demodulator circuit 5 demodulates the signal received by the receiver circuit 4 for thereby allowing the identification data of the IC card device to be derived from the demodulated output.

Figure 3:
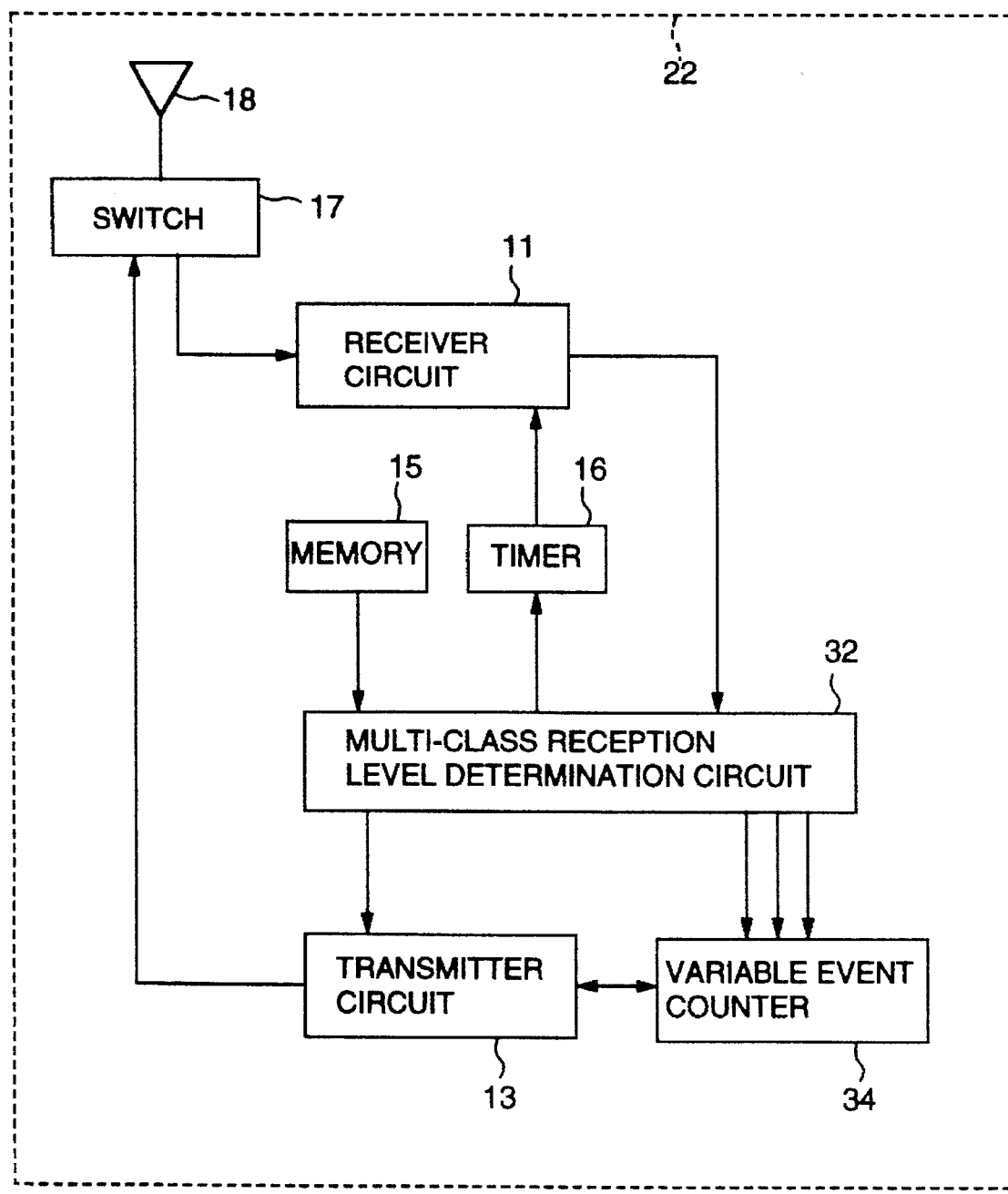
FIG. 3 is a block diagram showing a circuit configuration of an IC card device according to a second embodiment of the invention.

FIG. 3 is a block diagram showing a circuit configuration of the IC card device according to the second embodiment of the invention. Parenthetically, the same components as those shown in FIG. 2 are denoted by the same reference numerals. Referring to FIG. 3, the IC card device 22 is implemented as a contactless IC card for transferring data with the inquiring unit 1 shown in FIG. 1 by using radio waves. Description will turn to an internal structure of the IC card device 22. A reference numeral 11 denotes a receiver circuit for receiving the signal of frequency f1 transmitted from the inquiring unit. A reference numeral 32 denotes a multi-class reception level determination circuit for determining discriminatively the field intensity of the radio signal of frequency f1 to thereby sort this signal into one of e.g. three classes which are referred to as the first, second and the third classes for the highest to lowest reception levels in this order, respectively. A numeral 13 denotes a transmitter circuit for transmitting repeatedly a modulated signal of the frequency f2. A reference numeral 34 denote a variable event counter for counting the transmitting events of the transmitter circuit 13 up to a preset number which is set to "4", "3" or "1" for the aforementioned third, second or first classes, respectively. A memory 15 stores therein identification data inherent to the IC card device 22. A timer 16 measures time at least for a preset time period.

Next, description will be directed to operation of the IC card device according to the present embodiment. The receiver circuit 11 incorporated in the IC card device 22 receives the signal of frequency f1 transmitted from the transmitter circuit 3 of the inquiring unit 1. As the IC card device 22 approaches the inquiring unit 1, the field intensity of the signal of frequency f1 received by the receiver circuit 11 of the IC card device 22 increases. When it is decided by the multi-class reception level discrimination circuit 12 that the reception level of the field intensity of the radio signal of frequency f1 belongs to one of the three classes (first, second or third class), the identification data is read out from the memory 15. The transmitter circuit 13 modulates the signal of frequency f2 with the identification data read out from the memory 15 and transmits repeatedly the modulated signal to the inquiring unit. When the number of times the identification data is transmitted from the transmitter circuit 13 (i.e., the transmitting events) reaches the number corresponding to the reception level of the signal of frequency f1 (e.g. "4" for the third level, "3" for the second level) or "1" for the first level, the variable event counter 34 stops the identification data transmitting operation of the transmitter circuit 13. On the other hand, when it is determined by the multi-class reception level determination circuit 32 that the field intensity of the radio signal of frequency f1 of the inquiring unit belongs to one of the aforementioned three classes, the timer 16 causes the receiver circuit 11 to stop reception of the signal of frequency f1 transmitted from the inquiring unit for a predetermined period.

In this way, in the case of the IC card device according to the second embodiment of the invention, the reception level of the signal of frequency f1 becomes high (first class) when a plurality of IC card devices coexist at a location covered by the radio signal substantially of same field intensity (near to the inquiring unit), whereby the number of times the identification data is set to one. On the other hand, when the number of the IC card devices 22 staying in the vicinity of the inquiring unit 21 is small (far from the inquiring unit), the reception level of the signal of frequency f1 is low (third class). Accordingly, the number of times the identification data is transmitted is set to four. In other words, the number of times the identification data is transmitted can be advantageously changed in dependence on the density of the IC card devices 22 in the vicinity of the inquiring unit 1.

In general, the field intensity at lateral sides of the inquiring unit 1 is weak when compared with the field intensity at the front of the inquiring unit. Even in that case, the IC card device 22 according to the second embodiment, which can change the number of times the identification data is emitted in dependence on the field intensity, is effective in approaching the inquiring unit by following any one of various possible routes to the inquiring unit 1.

As is apparent from the description of the first embodiment, the IC card device stops the reception of the signal transmitted from the inquiring unit after transmitting the identification data a predetermined number of times. Thus, the IC card device, which has once transmitted the identification data thereof, can not transmit again the data even when the IC card device stays for a predetermined time in an area having the same field intensity. Thus, even in such situation where people carrying the IC card devices or cars equipped with the IC card devices are resident in the vicinity of the inquiring unit, e.g. a hall floor in front of an elevator door or a gate of a parking area over which the field intensity of radio signal is substantially at the same level, interference due to the transmission of the identification data by the IC card devices more than a necessary number at times can be avoided.

Additionally, as is apparent from the description of the second embodiment of the invention, the reception level of the signal transmitted from the inquiring unit is high when a plurality of IC card devices stay in a region where the field intensity of the radio signal is substantially at the same level. In that case, the number of times the identification data is transmitted is increased. Conversely, since the aforementioned signal reception level becomes low when the number of the IC card devices resident in the vicinity of the inquiring unit is small, the number of identification data transmitting events is decreased. In this manner, by changing the number of identification data transmitting events in dependence on the density of the IC card devices prevailing in the vicinity of the inquiring unit, the IC card device can transmit the identification data for an optimal number of times at any distance to the inquiring unit or any relative position to the inquiring unit or any distance to other IC card devices.

I claim:

1. An IC card device comprising:

receiver means for receiving a radio signal transmitted to said IC card device to thereby output a reception signal;

a memory in which data is previously stored;

reception level determination means for determining a level of said reception signal output from said receiver means and reading out the data stored in said memory to output said data when determining that said level of said reception signal output from said receiver means exceeds a predetermined threshold level;

transmitter means for repeatedly transmitting the data output from said reception level determination means;

event counter means for counting a number of times said data is transmitted from said transmitter means to thereby stop a transmitting operation of said transmitter means when said number of times reaches a preset number; and timer means for stopping receiving operation of said receiver means for a predetermined time period when said reception level determination means determines that a level of the reception signal output from said receiver means exceeds a predetermined threshold level.

2. An IC card device according to claim 1, wherein:

said reception level determination means sorts said level of said reception signal output from said receiver means into one of plural classes; and said event counter means sets said preset number in accordance with a class to which the level of said reception signal belongs.

3. An IC card device according to claim 2, wherein:

said event counter means sets said preset number such that the number of times said data is transmitted from said transmitter means becomes smaller for the class in which the level of said reception signal is higher.

\* \* \* \* \*